United States Patent
Leone et al.

(10) Patent No.: US 7,621,257 B1
(45) Date of Patent: Nov. 24, 2009

(54) ENGINE VALVE OPERATION

(75) Inventors: Thomas G. Leone, Ypsilanti, MI (US);
Donald J. Lewis, Howell, MI (US)

(73) Assignee: Ford Global Technologies, LLC,
Dearborn, MI (US)

( * ) Notice: Subject to any disclaimer, the term of this patent is extended or adjusted under 35 U.S.C. 154(b) by 0 days.

(21) Appl. No.: 12/113,884

(22) Filed: May 1, 2008

(51) Int. Cl.
*F01L 1/34* (2006.01)

(52) U.S. Cl. .................. 123/431; 123/90.15; 123/575; 123/1 A

(58) Field of Classification Search .................. 123/1 A, 123/431, 575–578, 90.15–90.18
See application file for complete search history.

(56) References Cited

U.S. PATENT DOCUMENTS

| | | | |
|---|---|---|---|
| 7,275,515 B2 * | 10/2007 | Ikoma | 123/305 |
| 7,287,492 B2 * | 10/2007 | Leone et al. | 123/1 A |
| 7,287,509 B1 | 10/2007 | Brehob | |
| 7,454,285 B2 * | 11/2008 | Christie et al. | 701/105 |
| 7,461,628 B2 * | 12/2008 | Blumberg et al. | 123/304 |
| 2006/0102136 A1 * | 5/2006 | Bromberg et al. | 123/198 A |
| 2006/0102146 A1 * | 5/2006 | Cohn et al. | 123/406.29 |

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

Various approaches are described for operating an engine in a vehicle having variable valve operation for an intake and/or exhaust valve of the cylinder. In one example, a method comprises delivering a first fuel to a cylinder of the engine from a first injector; delivering a second fuel to the cylinder of the engine from a second injector, where a composition of at least one of the first or second fuels varies; and adjusting the variable valve operation responsive to the varying composition and further based on variation in the delivery of the first or second fuel.

18 Claims, 4 Drawing Sheets

ENGINE VALVE OPERATION

FIELD

The present description relates to a method for controlling valvetrain settings for an internal combustion engine operating with a variety of fuels of varying composition and fuel delivery options.

BACKGROUND AND SUMMARY

Engines may use various forms of fuel delivery to provide a desired amount of fuel for combustion in each cylinder. One type of fuel injection, or delivery, uses a port injector for each cylinder to deliver fuel to respective cylinders. Still another type of fuel injection uses a direct injector for each cylinder. One of the considerations when choosing an appropriate fuel delivery system may be the fuel type present in the fuel tank. With the recent advent of alternate fuels such as alcohol-based fuels and fuel blends for automotive applications, various engine control systems may make adjustments to a variety of engine operations, for example fuel injection timing, spark timing, or boost, based on the alcohol content of the engine fuel.

One such example is described in U.S. Pat. No. 7,287,509 wherein an alcohol-fuelled engine is described that utilizes direct injection along with an appropriate alcohol content based boost, spark timing, and fuel control system to permit efficient performance. The engine's control system also adjusts valve operation based on the alcohol content of the fuel.

However, the inventors have herein recognized a potential issue with such an approach. Specifically, valve timing settings that ignore various interactions between fuel type and injection type may lead to degraded performance. For example, operating constraints related to engine knock, combustion stability, and an available intake manifold pressure, can each be affected not only by fuel type and injection type, but also by the interactions among fuel types and injection types.

In one example, the above issues may be addressed by a method of operating an engine in a vehicle having variable valve operation for an intake and/or exhaust valve of the cylinder, the method comprising: delivering a first fuel to a cylinder of the engine from a first injector; delivering a second fuel to the cylinder of the engine from a second injector, where a composition of at least one of the first or second fuels varies; and adjusting the variable valve operation responsive to the varying composition and further based on variation in the delivery of the first or second fuel.

By adjusting valve operation, such as valve timing, based on a fuel composition, and the delivery of a first and second fuel, it may be possible to take into account interactions between them. For example, valve timing may be adjusted responsive to variation in the amount of ethanol in a fuel blend that is directly injected into the engine, as well as responsive to the relative distribution of the total amount of injected fuel from among a plurality of injectors for the cylinder. Such compensation may allow the engine to operate efficiently even when the fuel type and injection type changes dynamically during engine operation.

In one particular example, the engine may shift delivery of fuel to a cylinder from predominately direct injection to predominately port injection (e.g., due to a decrease in engine load). In a first circumstance, the directly injected fuel may have a higher ethanol amount (e.g., E85), whereas in a second circumstance it may have a lower ethanol amount (e.g., E50), depending on what fuels an operator adds. However, in the first circumstance, the valve timing may be advanced/retarded to a greater/lesser extent than that of the second circumstance to reduce issues related to combustion stability, for example. In this way, improved operation may be achieved taking into consideration interactions between the fuel composition variation and the location from where the fuel is delivered to the cylinder.

Note that various valve operation adjustments may be used, such as advancing valve timing, retarding valve timing, increasing valve lift, decreasing valve lift, increasing valve overlap, decreasing valve overlap, advancing intake valve opening, retarding intake valve opening, advancing intake valve closing, retarding intake valve closing, advancing exhaust valve opening, retarding exhaust valve opening, advancing exhaust valve closing, retarding exhaust valve closing, and combinations thereof, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
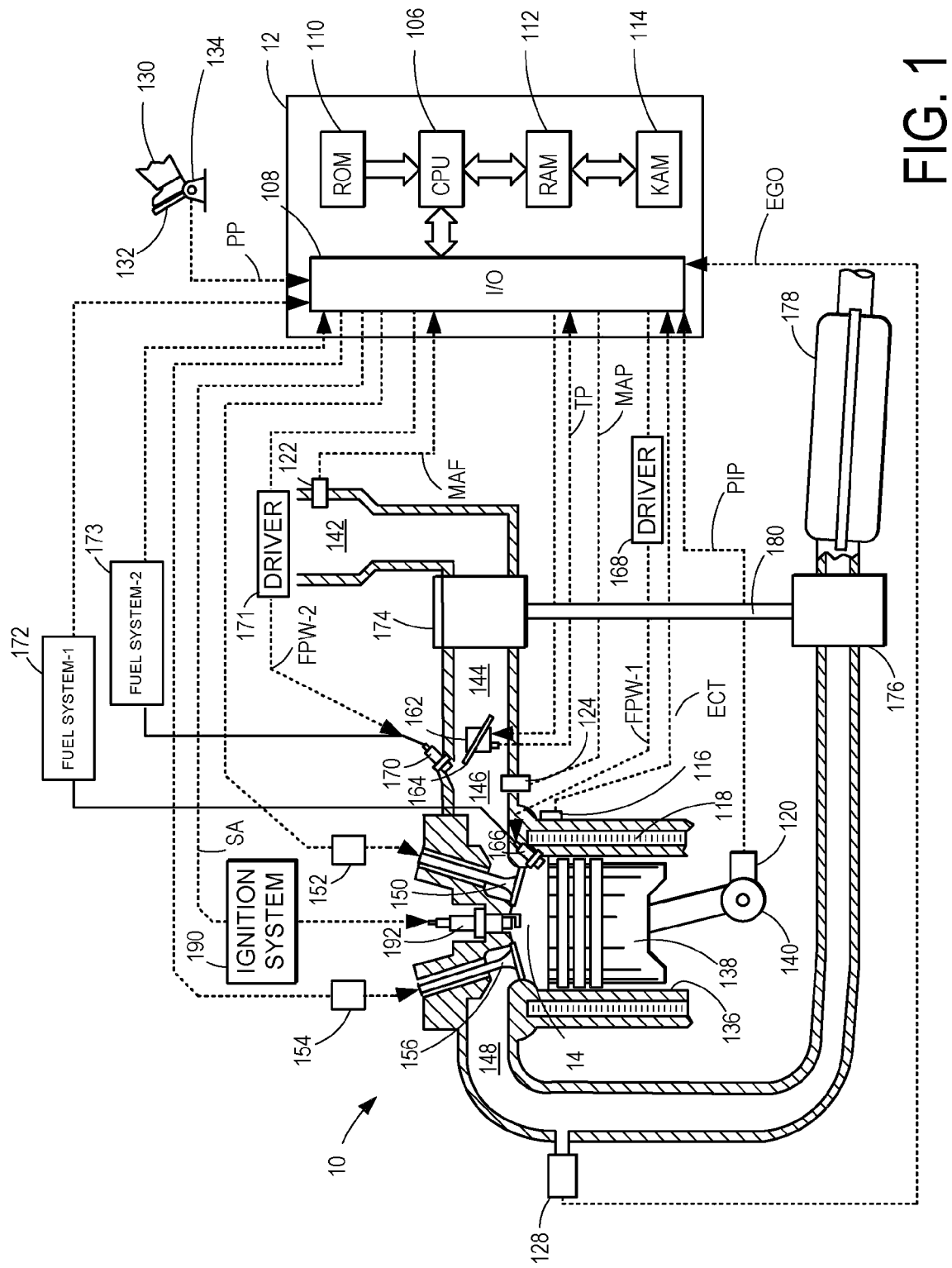
FIG. 1 shows an example embodiment of a combustion chamber operating with a plurality of fuel injector options.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148.

Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system. The control system for adjusting variable valve operation based on the composition characteristics of fuel being used, the fuel delivery method (and distribution thereof) chosen, as well as other engine operating constraints, as disclosed in this application, is further described in FIG. 2.

Returning to FIG. 1, Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system-2 173 including a fuel tank, a fuel pump, and a fuel rail. Note that a single driver 168 or 171 may be used for both fuel injection systems, or multiple drivers, for example driver 168 for fuel injector 166 and driver 171 for fuel injector 170, may be used, as depicted.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below. The relative distribution of the total injected fuel among injectors 166 and 170 may be referred to as an injection type. For example, injecting all of the fuel for a combustion event via injector 166 may be an example of a first injection type, injecting all of the fuel for a combustion event via injector 170 may be an example of a second injection type, injecting two-thirds of the fuel for a combustion event via injector 166 and the other third of the fuel via injector 170 may be an example of a third injection type, injecting a third of the fuel for a combustion event via injector 166 and the other two-thirds of the fuel via injector 170 may be an example of a fourth injection type. Note that these are merely examples of different injection types, and various other types of injection and delivery may be used, and further the approach may be applied to more than two injectors as well. Additionally, it should be appreciated that port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel systems 172 and 173 may hold fuel with different fuel qualities, such as different fuel compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of one or both fuel tanks may vary frequently. In one example, a driver may refill fuel tank 172 with E85 one day, and E10 the next, and E50 the next, while fuel tank 174 may have gasoline one day, and E10 the next, and gasoline the next. The day to day variations in tank refilling can thus result in frequently varying fuel compositions of each of the fuels in tanks 172 and 174, thereby affecting the fuel compositions and/or fuel qualities delivered by injectors 166 and 170, respectively. The differences in fuel composition and/or quality between injectors 166 and 170 may hereon be referred to as fuel type. Also, the fuel types may be separately delivered to the combustion chamber, or mixed before delivery to the combustion chamber.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Engine 10 may further include a fuel vapor purging system (not shown) for storing and purging fuel vapors to the intake manifold of the engine via vacuum generated in the intake manifold. Additionally, engine 10 may further include a positive crankcase ventilation (PCV) system where crankcase vapors are routed to the intake manifold, also via vacuum.

Storage medium read-only memory 110 can be programmed with computer readable data representing instructions executable by processor 106 for performing the methods described below as well as other variants that are anticipated but not specifically listed.

Figure 2:
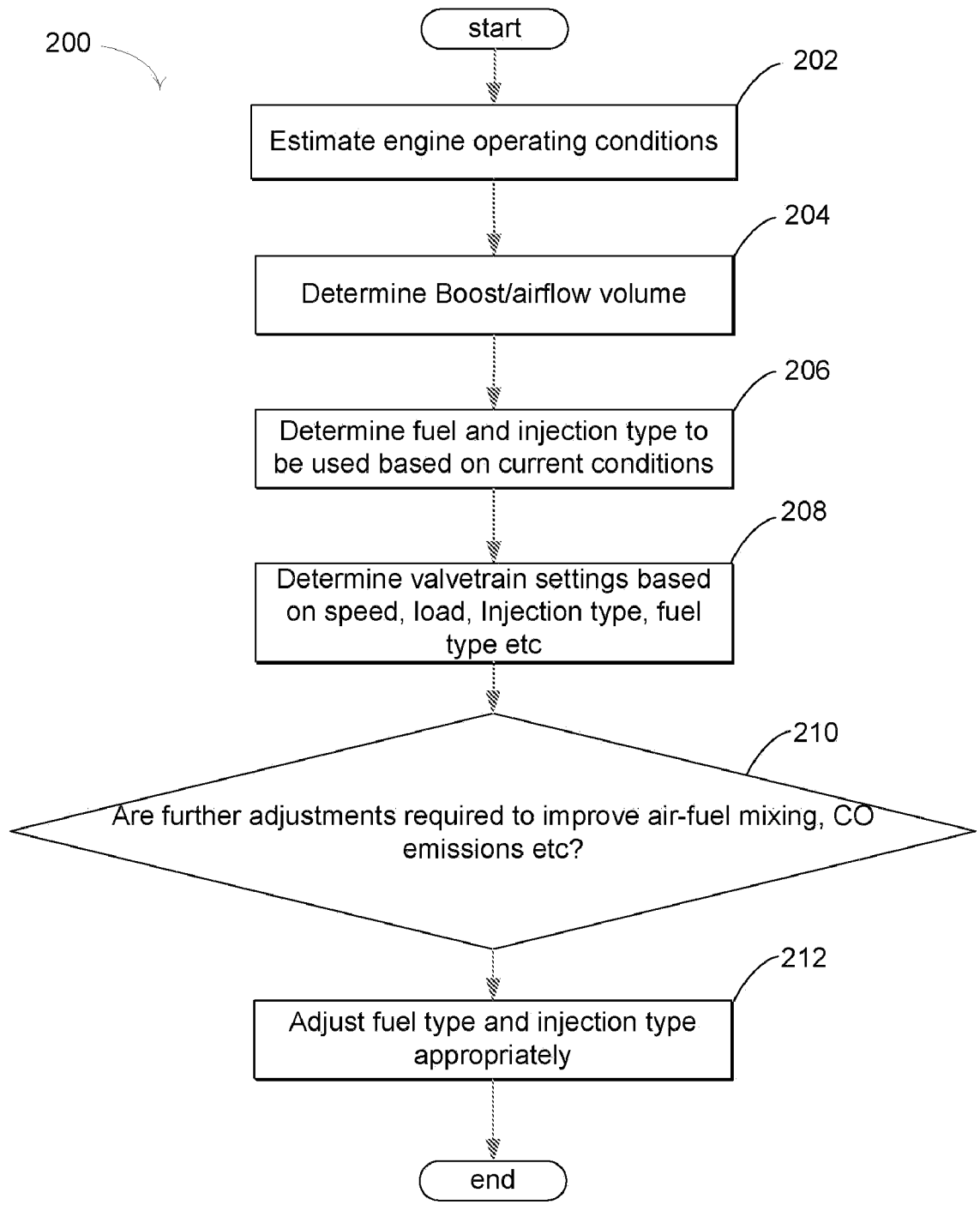
FIG. 2 shows a high level flow chart for an engine starting and running operation according to the present disclosure.

FIG. 2 describes a control system routine for controlling engine running operations for an internal combustion engine affecting valve operation, a fuel type delivered, as well as the type of injection used, and combinations thereof. Specifically, the routine determines a fuel and injection type to be used under various operating conditions and accordingly implements settings and/or adjustments to the engine variable valvetrain operation so as to permit efficient operation of the engine. In doing so, the control system strives to reduce and/or account for constraints related to intake manifold pressure, combustion stability and knock, for example.

At 202 the engine operating conditions are determined, measured, and/or estimated. These include, but are not limited to, engine temperature, engine coolant temperature, intake air temperature, exhaust temperature, engine speed, manifold pressure, cylinder air amount, feedback from a knock sensor, desired engine output torque, spark timing, barometric pressure, etc.

Based on the identified operating conditions, a desired boost value or desired air flow volume is calculated at 204. Then, at 206, a desired fuel and an appropriate delivery method or injection type are selected based on the boost value and the identified engine operating conditions.

Figure 4:
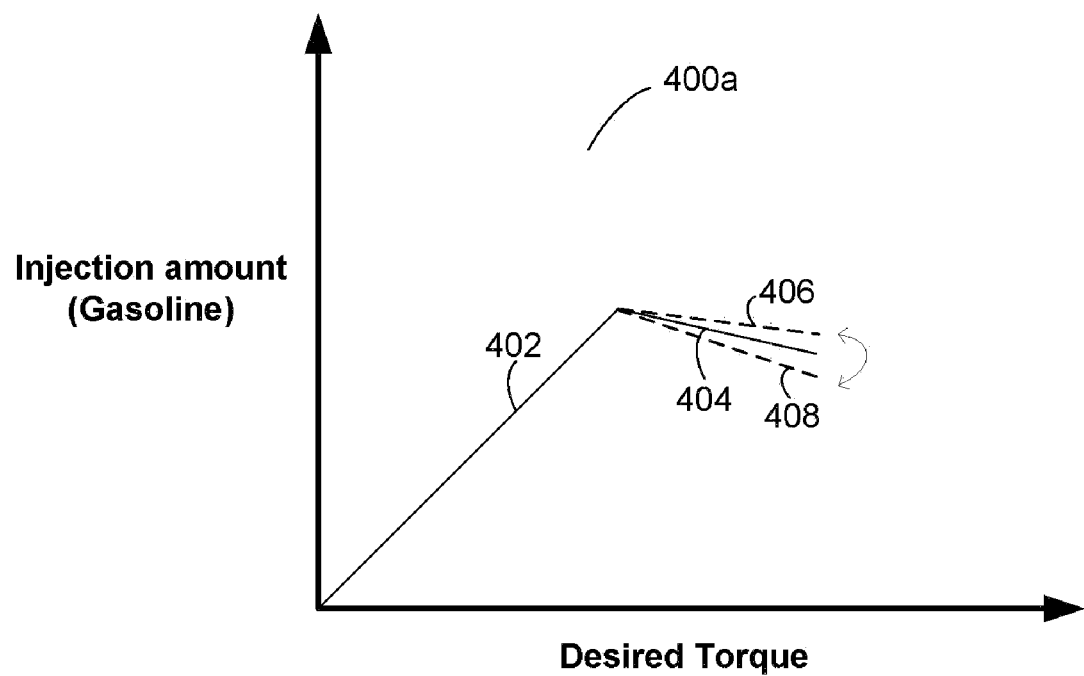
FIG. 4 shows an example map of the desired injection type based on a desired engine output and based on the fuel type available.
Figure 4:
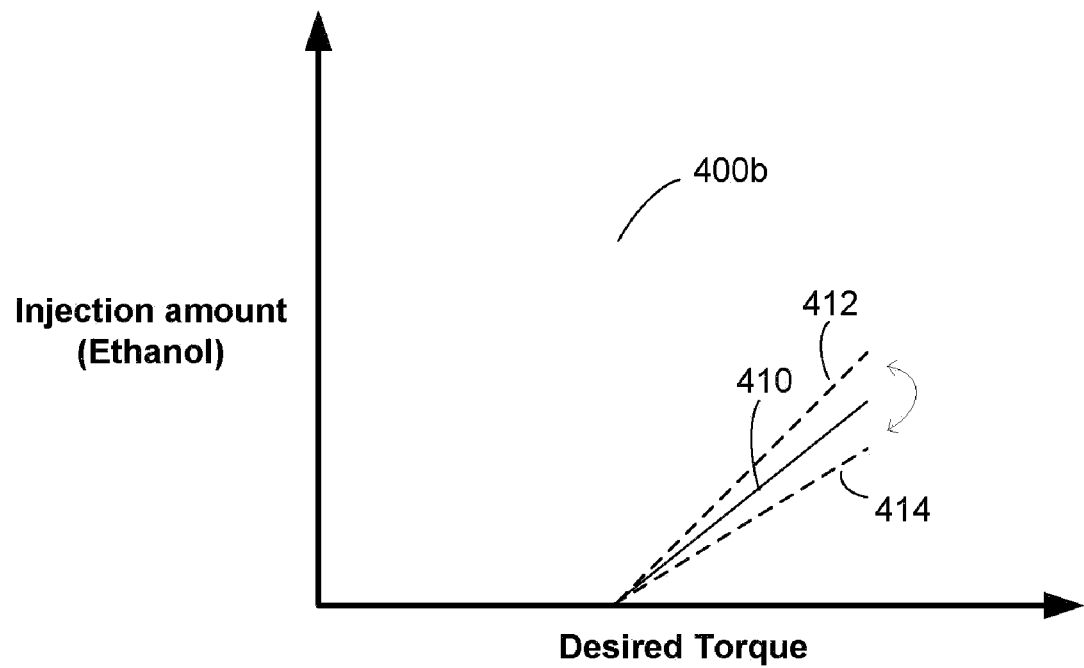

The fuel combustion characteristics and charge cooling abilities of the alcohol blend fuels previously described may permit a higher boost to be attained by the engine under otherwise identical engine operating conditions. In alternate embodiments of the engine where more than one injection type may be provided to a cylinder, the routine further specifically selects an appropriate fuel injection type, and consequently fuel type, or an appropriate distribution of the total amount of fuel to be injected among the multiple injectors based on the identified engine operating conditions and a desired engine output. An example map of the desired injection type based on a desired engine output and based on the fuel type available is depicted in FIG. 4 and further explained herein.

Returning to FIG. 2, once the desired injection type has been ascertained at 206, the routine then proceeds to compute valvetrain settings at 208. This encompasses various settings considered for efficient valve operation. These settings include timing the opening/closing of intake/exhaust valves, duration of opening of valves, and synchronizing an electric valve actuator or the cam actuation system depending on the valve actuation mechanism, for example. The routine may not only consider parameters such as driver demand, required torque, ambient air temperature, ambient humidity, engine coolant temperature, mass air flow and barometric pressure, but also constraints related to intake manifold pressure, knock, and combustion stability. In one example, maps such as noted in FIG. 3 may be used to select a variable valve operation based on the relative injection type, and taking into account a fuel composition or a fuel quality variation in one or both of port and directly injected fuel.

In particular, valvetrain limits related to knock, combustion stability and manifold pressure may be significantly impacted by the fuel and injection type of the engine. This may apply to various variable valvetrains such as those noted herein, including variable camshaft timing (VCT), cam profile switching (CPS), fully variable valve lift (VVL), continuously variable valve timing and camless engines, for example. By suitably advancing or retarding valve timing, or by increasing or decreasing valve overlap, based on a fuel and injection type, and further based on a set of constraint limits, the variable valvetrain control system may allow the engine to operate over a larger load range without a reduction in efficiency or an increase in emissions. Other possible adjustments to the variable valve operation include increasing or decreasing the valve lift, altering the valve cam profile, altering the number of valves that are open or closed in a given cycle, and valve deactivation, for example. Further still, valve adjustments based on fuel and injection types may include limiting an advance and/or retard of valve timing to a minimum and/or maximum value, where the minimum and/or maximum value are based on fuel and injection types.

In one embodiment, engine 10 uses late (e.g., substantially after bottom dead center of the intake stroke) intake valve closing to reduce volumetric efficiency of the engine and improve pumping losses at part load. An alternate embodiment may use early intake valve closing at part load (e.g., substantially before bottom dead center of the intake stroke). In one aspect of this embodiment, a DI fuel injector to inject an alcohol based fuel blend such as E85 or M85 and a PFI injector to inject gasoline or a gasoline/alcohol blend of lower alcohol ratio, such as E10, may be provided. In one aspect of this embodiment, direct injection of ethanol may be preferentially used when the engine is running at medium to high load. However, under these operating conditions, the valvetrain settings may be limited by high intake manifold pressure due to high internal exhaust gas recirculation (EGR) and/or very late intake valve closing. This is further exacerbated if an intake manifold vacuum is desired such as for reducing noise, vibration, and/or harshness (NVH), for positive crankcase ventilation (PCV), or for purging fuel vapors from a charcoal canister, for example. Under these circumstances, the engine may be unable to achieve the desired torque without limiting the valvetrain set-point. In such a scenario, the valvetrain control may suitably advance the intake valve closing timing and/or decrease the internal EGR and/or alter the cam profile so as to account for variation in injection type for a given fuel type to thereby maintain volumetric efficiency. For example, PFI gasoline may give lower volumetric efficiency than DI ethanol, so the valvetrain may use a more advanced intake valve closing time at medium to high loads for PFI gasoline than for DI ethanol.

Similarly, the low effective compression ratio generated under the previously described conditions of high internal EGR and very early or very late intake valve closing, may also tend to degrade combustion stability. Combustion stability can become the primary constraint on valvetrain settings at low loads, under some conditions. Combustion stability may be further degraded upon cooling of the air-fuel mixture as a result of a direct injection of an ethanol-based fuel. Thus, under some operating conditions, direct injection of an ethanol-based fuel at light loads may degrade stability. As such, port injection of gasoline may be used to a greater extent under such conditions However, in the event of degraded operating conditions (such as a PFI system degradation, incorrect fueling of the fuel tanks by the operator, or a lack of gasoline in the fuel tank 173, for example), the system may shift to greater use of direct injection of an ethanol-based fuel. Under the constraints of such conditions, the valvetrain control system incorporated into the engine control system can implement adjustments to the variable valve operation based on the current fuel and injection type and suitably advance intake valve closing timing and/or decrease the internal EGR and/or alter the cam profile so as to allow the maximum valvetrain benefits to be attained while maintaining sufficient combustion stability, for example.

Figure 3:
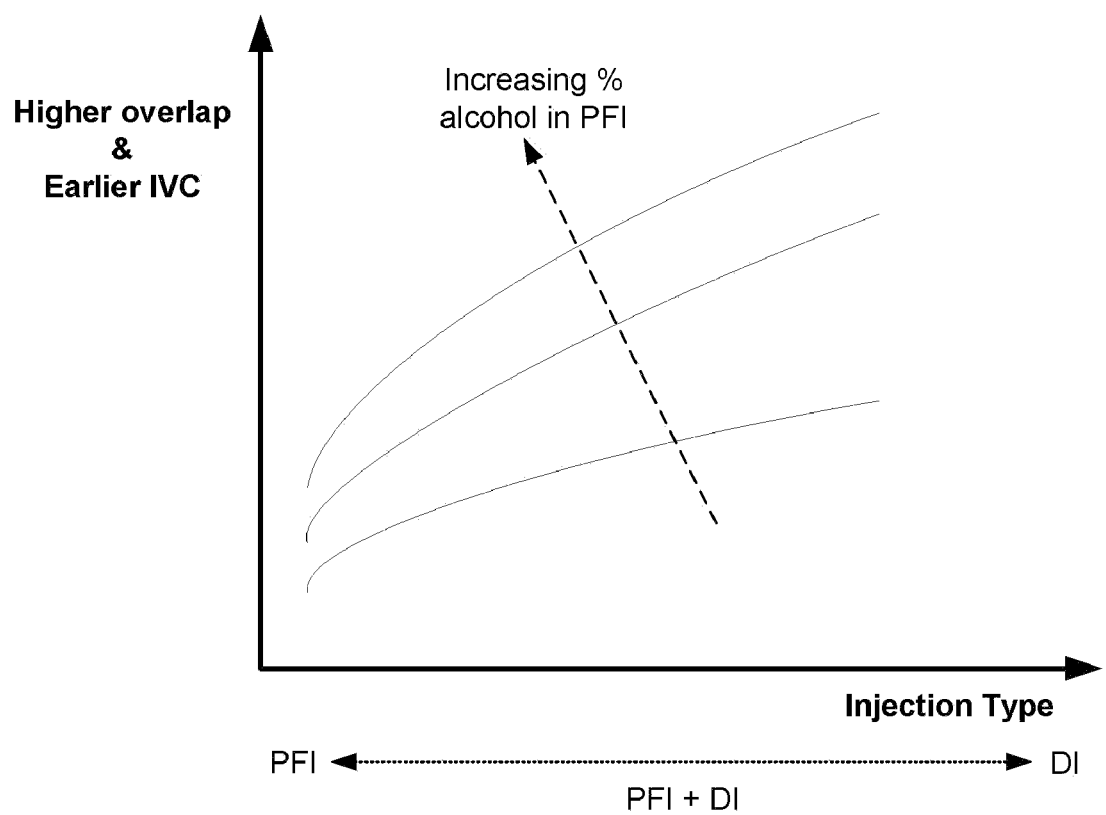
FIG. 3 shows an example map illustrating differences in valve timing based on varying fuel injection type and varying alcohol content for an alcohol-based fuel.

Another constraint that appears at medium to high load is engine knock. Knocking can be particularly prevalent under conditions of low ambient humidity and/or high intake air temperature. Here too, as described previously, the situation may be exacerbated under conditions of high internal EGR and/or when intake valve closing (IVC) occurs close to bottom center, wherein the effective compression ratio reaches high levels. Knocking can be substantially controlled with direct injection of an alcohol-based fuel. This is primarily due to the charge cooling effect of alcohol based fuels, but their high octane rating gives knock benefits with either direct injection or port injection. The ability to control knock this way offers the opportunity to further optimize valvetrain control at these speed/loads. For the example of dual independent VCT at knock-limited speed/loads, greater use of DI alcohol fuel allows higher valve overlap for increased internal EGR, improved NOx emissions, and improved efficiency. Higher valve overlap at medium to high loads uses earlier IVC to maintain volumetric efficiency. Without DI alcohol, higher valve overlap and earlier IVC would both be constrained by knock at medium to high loads. Therefore, the amount of increased overlap and IVC timing change are a function of DI alcohol, as illustrated in FIG. 3. FIG. 3 also indicates that higher alcohol concentration in the PFI fuel also allows higher overlap and earlier IVC, due to improved octane. Note that FIG. 3 illustrates valvetrain control at medium to high load, where knock is the constraint. At other speed-loads there are other constraints such as combustion stability and intake manifold pressure, as previously described, and the optimum valvetrain control may be different from the illustration in FIG. 3.

Additional ancillary improvements to engine running conditions may also be addressed by the described routine at 210. These include improvements to air/fuel mixing, CO emission levels and overall efficiency. For example, if it is determined at 210 that at the current running speed and load and valvetrain settings, and for the given combination of fuel and injection type, the CO emissions levels are high, the air/fuel mixing is poor, or that the engine is suffering from overall degraded efficiency, the routine may decide at 212 that it would be advantageous to switch to an alternate combination of fuel type and injection type.

In this way, by computing adjustments to variable valve operation responsive to the conditions of current fuel type and current fuel injection type, in addition to parameters such as speed, load, and temperature, for example, the valvetrain control routine allows the engine to work closer to the limits of engine knock, intake manifold pressure and combustion stability, thereby compensating for those effects and enhancing fuel economy, exhaust emission quality, and wide-open throttle performance of the engine.

Additionally, the adjustment to valve operation may further be enabled or disabled based on various other operating parameters, such as based on whether fuel vapor purging is in progress, etc. For example, if valve adjustments are made to maintain sufficient vacuum for purging, then such adjustments may be suspended when vapor purging is not carried out. Still other variations may also be used.

The same analysis may also be applicable for an alternate aspect of the same engine where the different fuel types include fuels with different qualities, different octane ratings, different heat of vaporizations, and/or combinations thereof. For example, if the direct injection tank was initially filled with gasoline rated at 88 octane and subsequently refilled with gasoline rated at 91 octane, the valvetrain setting may be adjusted to attain optimum performance with the higher octane fuel.

Referring now to FIG. 4, it depicts an example map of the desired injection type based on a desired engine output and based on the fuel type available. In particular, FIG. 4 shows the injection amount of PFI and DI fuels at 400a and 400b, respectively, for the example of PFI gasoline and DI ethanol. As shown by the solid lines 402 and 410, as the desired torque increases, the injection type shifts from PFI gasoline to a mixture of PFI gasoline and DI ethanol, with increasing use of ethanol at higher torques. Further note that, as shown by the dashed lines, the relative variation in injection types with torque may vary depending on the composition of the fuels. Specifically, the dashed lines indicate how the graph may vary as the alcohol concentration in the ethanol is increased (406, 414) or decreased (408, 412).

It will be appreciated that while FIG. 4 shows one specific example set of fuel type and injection type, various others may be used.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an engine in a vehicle having variable valve operation for an intake and/or exhaust valve of the cylinder, the method comprising
    delivering a first fuel to a cylinder of the engine from a first injector;
    delivering a second fuel to the cylinder of the engine from a second injector, where a composition of at least one of the first or second fuels varies; and
    adjusting the variable valve operation responsive to the varying composition and further based on variation in the delivery of the first or second fuel, the adjusting including during a first condition with a first fuel composition, adjusting the variable valve operation to a first extent in response to a variation in an amount of the delivery of the first and second fuel; and during a second condition with a second fuel composition different than the first fuel composition, adjusting the variable valve operation to a second extent different than the first extent in response to the variation in the amount of the delivery of the first and second fuel.

2. The method of claim 1 where the composition varies due to different fuel blends delivered to a fuel tank in the vehicle.

3. The method of claim 2 where the composition includes different alcohol blends.

4. The method of claim 3 where the first fuel includes a greater ratio of ethanol than the second fuel, and where the first injector is a direct injector.

5. The method of claim 4 where the variable valve operation includes variable cam timing.

6. The method of claim 1 wherein the first and second injectors are port fuel injectors.

7. The method of claim 1 wherein the variable valve operation is adjusted responsive to an alcohol blend indication of the first fuel, where the first fuel is delivered via a direct injector, and where the variable valve operation is further adjusted responsive to a distribution of a total amount of injected fuel among the first and second injectors.

8. The method of claim 1 wherein the first and second fuels are further adjusted responsive to engine knock.

9. The method of claim 1 further comprising adjusting the variable valve operation responsive to variation in an alcohol composition of the first fuel and further responsive to variation in an alcohol composition of the second fuel.

10. A method of operating an engine having variable valve operation for an intake and/or exhaust valve of the cylinder, the method comprising
    delivering fuel to a cylinder of the engine from among at least a plurality of injectors including at least a first injector and a second injector, the first injector delivering a first fuel and the second injector delivering a second fuel, the first fuel having a quality differing from that of the second fuel; and adjusting the variable valve operation responsive to interactions between quality of at least one of the first fuel and second fuel, and relative distribution of an amount of the first fuel and an amount of the second fuel injected.

11. The method of claim 10 where said first injector is a direct injector and said second injector is a port fuel injector.

12. The method of claim 10 where said first injector is a port fuel injector and said second injector is a port fuel injector.

13. The method of claim 10 where said valve operation comprises varying valve timing responsive to the quality of the first and second fuels, and the relative distribution of the amount of the first fuel and the amount of the second fuel injected.

14. A system for an engine, comprising:
a variable valve timing system for varying operation of an intake and/or exhaust valve of a cylinder of the engine;
a port fuel injector coupled to the cylinder;
a direct injector coupled to the cylinder;
a controller for varying valve timing of the variable valve timing system responsive to a composition of fuel delivered via the direct injector, an amount of fuel delivered by the port injector, and an amount of fuel delivered by the direct injector, the controller further varying valve timing within a limit value, the limit value based on the composition of fuel delivered via the direct injector, the amount of fuel delivered by the port fuel injector, and the amount of fuel delivered by the direct injector.

15. The system of claim 14 where the controller advances valve timing as a concentration of alcohol in the fuel delivered via the direct injector is increased.

16. The system of claim 14 where the controller increases valve overlap as a concentration of alcohol in the fuel delivered via the direct injector is increased.

17. The system of claim 14 wherein the limit value is further based on at least one of combustion stability and manifold pressure.

18. The system of claim 14 further comprising a fuel vapor purging system, where the variation of valve timing is further responsive to whether the fuel vapor purging system is purging vapors to the engine.

* * * * *